C. S. COLLINS.
Vessels for Steaming Oysters.
No. 136,588.
Patented March 11, 1873.
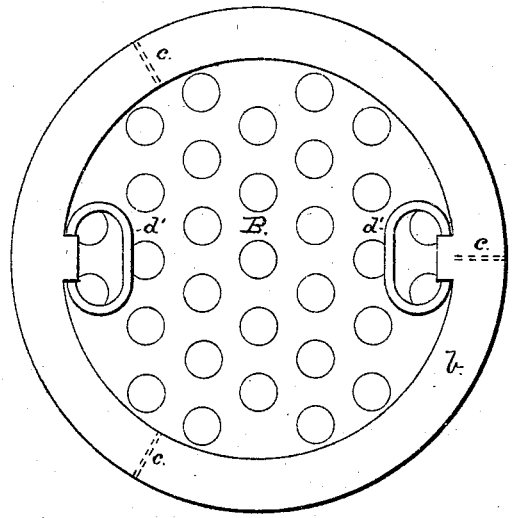
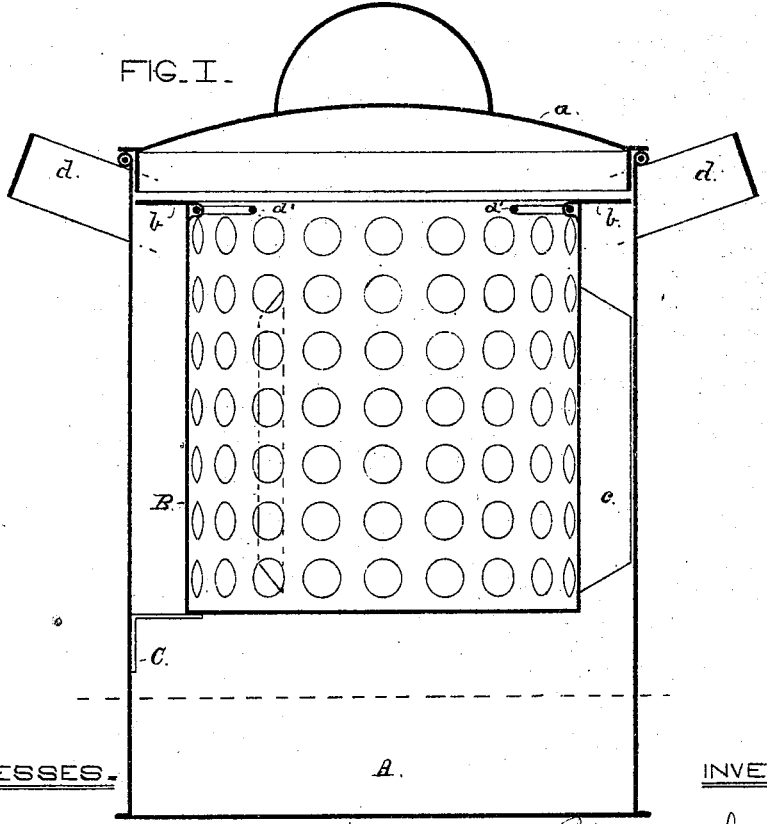
WITNESSES.
Jno. McKim
Joseph Bragg
INVENTOR.
Charles S. Collins
by G H & W T Howard
attys

UNITED STATES PATENT OFFICE.

CHARLES S. COLLINS, OF BALTIMORE, MARYLAND, ASSIGNOR OF ONE-HALF HIS RIGHT TO JOHN T. FLEEHEARTY, OF SAME PLACE.

IMPROVEMENT IN VESSELS FOR STEAMING OYSTERS.

Specification forming part of Letters Patent No. 136,588, dated March 11, 1873.

*To all whom it may concern:*

Be it known that I, CHARLES S. COLLINS, of the city of Baltimore and State of Maryland, have invented certain Improvements in Vessels for Steaming Oysters in Shell, or for other culinary or household purposes, of which the following is a specification; and I do hereby declare that in the same is contained a full, clear, and exact description of my said invention, reference being had to the accompanying drawing and to the letters of reference marked thereon.

My invention relates to certain devices whereby a greater perforated surface is given to the vessel wherein the oysters or other articles to be steamed are placed, and in other combinations and features tending to keep the perforated vessel steadily in its proper position, and adapting it to be conveniently handled or removed.

In the accompanying drawing forming a part of this specification, in which similar letters of reference indicate similar parts of the invention in both views, Figure I is a vertical section of a vessel having my improvements therein. Fig. II is a top view of the above-named perforated vessel.

A is an ordinary cylindrical vessel, having a cover, *a*. B is a cylindrical metallic dish, having its sides and bottom perforated, and a flange, *b*, at its upper edge, designed to bear against the inner surface of the vessel A to keep the perforated dish centrally within it. Projecting from the exterior surface of the cylindrical dish B are bracing-pieces *c*, intended to assist in keeping it in its place and to prevent its becoming bulged out of shape by the pressure of the mass placed within it. The cylindrical dish B rests upon small brackets C, secured to the interior of the vessel A at a certain height above the water-line, represented in Fig. I by the dotted lines. Handles *d* are attached to the outside of the vessel A, and others, *d'*, to the interior of the dish B, by means of which handles the vessel A can be lifted, and the dish B taken out for any necessary purpose. From the fact that the flange *b* fits closely to the interior of the vessel A, the steam arising from the heated water below the cylindrical dish finds immediate escape only through the bottom and sides thereof, and in so escaping necessarily permeates the mass of oysters in the shell or other matter placed within the dish to be steamed.

Having thus described my invention, what I claim as new, and wish to secure by Letters Patent of the United States, is—

In combination with the cylindrical perforated dish B supported within the steamer, as described, the flange *b*, bracing-pieces *c*, and handles *d'*, substantially as herein set forth.

In testimony whereof I have hereto subscribed my name, in the city of Baltimore, this 24th day of January, in the year of our Lord 1873.

CHARLES S. COLLINS.

Witnesses:
 WM. T. HOWARD,
 EDW. HAYES.